UNITED STATES PATENT OFFICE.

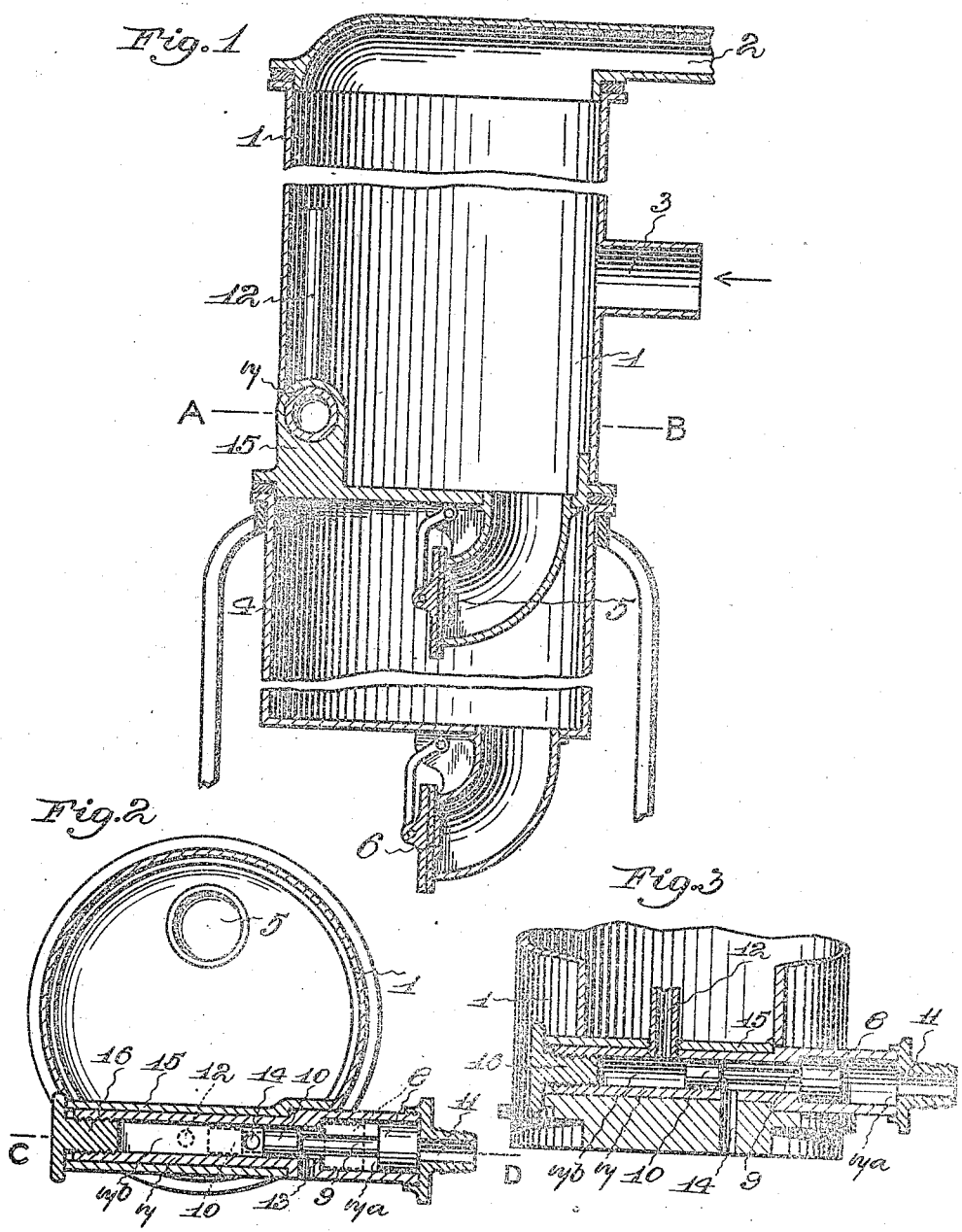

ROBERT BRUCE FORSYTH, OF CHRISTCHURCH, NEW ZEALAND, ASSIGNOR TO NORMAN JOHN DAYSH, OF NEW YORK, N. Y.

MILK-RELEASING APPARATUS FOR USE WITH MILKING-MACHINES.

1,195,573.

Specification of Letters Patent.

Patented Aug. 22, 1916.

Application filed February 25, 1914. Serial No. 820,852.

*To all whom it may concern:*

Be it known that I, ROBERT BRUCE FORSYTH, a subject of the King of Great Britain, residing at 189 Cashel street, Christchurch, in the Dominion of New Zealand, have invented new and useful Improvements in Milk-Releasing Apparatus for Use with Milking-Machines, of which the following is a specification.

This invention relates to devices for use with milking machines for releasing the milk from the vacuum, and to that particular type of releaser wherein the milk is received from the milk-pipe into a chamber maintained under a continuous vacuum, which chamber is connected by means of a non-return valve with a second chamber which is under pulsation and is provided with a second non-return valve adapted to give access from such pulsation chamber to the outer air. The arrangement being such that upon the vacuum in the pulsation-chamber reaching a degree equal to or above that of the vacuum-chamber, milk will flow by gravity from the latter through the said communicating valve into the pulsation chamber and upon the vacuum of the pulsation becoming sufficiently reduced milk will flow from the pulsation-chamber through the second valve into a receptacle provided to receive it under ordinary atmospheric pressure. In devices of this nature where the pulsation is provided from a pulsator situated at a distance and communicating with the chamber by means of a length of pipe, such pulsation is apt to become deadened, and so incapable of giving a sharp and positive action as desirable for the working of the releaser, while there is also a danger of milk finding its way through the pulsation-pipe into other portions of the apparatus not intended to receive it. Again, to secure satisfactory working of the device, it is desirable that the maximum vacuum of the pulsation-chamber shall be at least equal to that of the suction-chamber, which conditions cannot usually be obtained by the employment of a pulsator situated at a distance from the pulsation-chamber and using the ordinary suction of the milk-pipe as the source of vacuum for such pulsation.

It is the object of the present invention, therefore, to overcome these defects, and so render this type of apparatus more efficient. In carrying this object into effect the invention consists of employing a primary pulsation derived from any suitable source to actuate a secondary pulsator positioned adjacent to the releaser and adapted to provide a secondary pulsation to the pulsation-chamber of such releaser by placing said pulsation-chamber alternately in communication with the said vacuum-chamber and the atmosphere.

In order that the nature of the invention and its construction may be fully understood, reference will now be made to the accompanying sheet of drawings in which:—

Figure 1:—is a sectional elevation of a releaser constructed in accordance with the present invention. Fig. 2:—is a cross-section along the line A—B Fig. 1, and Fig. 3:—is a sectional elevation along the line C—D Fig. 2.

1 (Fig. 1) is the vacuum-chamber which is connected at its upper end with the vacuum-pipe 2, while the milk is admitted by means of the milk-pipe 3 which enters such chamber somewhat lower down in order to avoid the possibility of such milk being drawn into the vacuum-pipe. Beneath the chamber 1 is a second chamber 4 which is maintained under pulsation, while communicating between the chamber 1 and the chamber 4 is a flap or other suitable non-return valve 5. The chamber 4 is also provided with another similar non-return valve 6 adapted to give access therefrom to the atmosphere.

According to the present invention, upon the releaser so constructed, is mounted a cylinder 7, the bore of which is stepped to two diameters. Adapted to reciprocate in the larger diameter portion 7ª of the cylinder is a piston 8 which is rigidly connected by means of a shank member 9 with a piston 10 adapted to reciprocate in the smaller diameter portion 7ᵇ of the said cylinder. The portion 7ª of the cylinder is connected at its outer end by means of a pipe 11, with a primary pulsation obtained from any suitable source. The portion 7ᵇ of the cylinder is connected near its outer end by means of a pipe 12 with the vacuum chamber 1 at a point above the milk level, while at or near its inner end, at a point at all times between the pistons 8 and 10, the portion 7ᵇ is formed with an opening or vent 13 communicating with the atmosphere. In the portion 7ᵇ is formed also, at a point between the pipe 12 and vent 13, a port 14 communicating between such portion of the cylinder and the pulsation-chamber 4, the arrangement being such that as it reciprocates, the piston 10 will pass across from one side of the port 14 to the other side and thus place such port, and consequently the pulsation-chamber 4, in communication either with the atmosphere through the vent 13 or with the vacuum of the chamber 1 and thus produce what is herein termed the secondary pulsation. This reciprocal movement of the pistons is produced by means of a primary pulsation, which, as already explained, is communicated to the outer end of the portion 7ª through the pipe 11. As the outer end of the piston 10 is at all times under vacuum, it will be understood that, assuming the pistons to be as shown in full lines in Fig. 2, upon the outer end of the portion 7ª being placed in communication with the atmosphere, the pressure of the latter acting upon the outer end of the piston 8, will cause the pistons to move to the position shown in Fig. 3. Upon the end of such portion 7ª being placed under vacuum however, in consequence of the outer end of the piston 8 being greater in area than that of the piston 10, such pistons will be caused to return to the position shown in Fig. 2.

In order to facilitate the renewal the cylinder 7 is preferably in the form of a liner adapted to be slipped within an outer shell or sleeve 15 permanently secured to the releaser, such liner being secured in place by means of a cap or plug 16 screwed into the bore of such liner at the smaller end and having a head or flange adapted to abut with the end of the shell 15.

It will be seen, therefore, that by the present invention the source of pulsation for the pulsation-chamber is brought close to the latter thus avoiding the disadvantage of a long pipe connection, as hereinbefore explained, while any milk that may happen to be drawn into the pulsator will be discharged into the vacuum-chamber of the releaser. Again by obtaining the vacuum of the pulsation by placing the pulsation-chamber in communication with the vacuum-chamber, as herein described, it will be seen that the vacuums of such chambers must necessarily be equal.

I claim:

1. In a milk releaser of the class described, the combination of a milk receiving vacuum chamber, a pulsation chamber arranged adjacent to the vacuum chamber, a non-return connection between the vacuum and pulsation chambers, a pulsator mounted adjacent to the pulsation chamber in communication therewith, the pulsator being adapted to respond to primary pulsations produced by a primary pulsation apparatus to supply secondary pulsations to the pulsation chamber of the releaser by placing the said chamber alternately in communication with the atmosphere and with the vacuum chamber of the releaser, and a milk outlet for the pulsation chamber.

2. In a milk releaser of the class described, the combination of a milk receiving vacuum chamber, a pulsation chamber, a non-return connection between the vacuum and pulsation chambers, means for producing a pulsation in the pulsation chamber by placing the same alternately in communication with the vacuum chamber and with the atmosphere, and a milk outlet for the pulsation chamber.

In testimony whereof I have signed my name to this specification in the presence of two subscribing witnesses.

ROBERT BRUCE FORSYTH.

Witnesses:
PERCY RICHMOND CLIMIE,
CYRIL CARLYN COATES.